United States Patent
Ro et al.

(10) Patent No.: US 12,280,844 B2
(45) Date of Patent: Apr. 22, 2025

(54) PERSONAL MOBILITY AND CONTROL METHOD THEREOF

(71) Applicants: Hyundai Motor Company, Seoul (KR); Kia Corporation, Seoul (KR)

(72) Inventors: Hee Jin Ro, Seoul (KR); Yocheol Jang, Suwon-si (KR); Duck Young Kim, Seongnam-si (KR); Donghee Seok, Suwon-si (KR); Ilsun Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 548 days.

(21) Appl. No.: 17/538,040

(22) Filed: Nov. 30, 2021

(65) Prior Publication Data
US 2022/0315144 A1 Oct. 6, 2022

(30) Foreign Application Priority Data
Apr. 6, 2021 (KR) .................. 10-2021-0044468

(51) Int. Cl.
*B62H 5/02* (2006.01)
*B62H 1/02* (2006.01)
*B62H 5/06* (2006.01)
*E05B 47/00* (2006.01)

(52) U.S. Cl.
CPC ............... *B62H 5/02* (2013.01); *B62H 1/02* (2013.01); *B62H 5/06* (2013.01); *E05B 47/0012* (2013.01)

(58) Field of Classification Search
CPC ............ B62H 5/02; B62H 5/06; B62K 3/002
See application file for complete search history.

(56) References Cited

U.S. PATENT DOCUMENTS

| | | | | |
|---|---|---|---|---|
| 1,460,015 | A * | 6/1923 | Cappellari | B62H 5/06 70/309 |
| 2,231,546 | A * | 2/1941 | Neiman | B62H 5/06 70/371 |
| 10,501,137 | B2 * | 12/2019 | Mori | B62H 5/04 |
| 11,636,723 | B2 * | 4/2023 | Lee | G07F 17/0057 180/220 |
| 11,752,890 | B2 * | 9/2023 | Harpin | B62J 45/00 320/109 |
| 12,071,190 | B2 * | 8/2024 | Huang | B62H 5/04 |
| 2018/0244329 | A1 * | 8/2018 | Mori | B62K 21/00 |
| 2020/0102032 | A1 * | 4/2020 | Huang | B62H 5/20 |

FOREIGN PATENT DOCUMENTS

| | | | | |
|---|---|---|---|---|
| CN | 2623569 | Y * | 7/2004 | |
| CN | 105799815 | A * | 7/2016 | ............... B62H 5/06 |
| CN | 106114694 | A * | 11/2016 | ............... B62H 5/06 |
| EP | 3584146 | A1 * | 12/2019 | ............... B62H 5/06 |
| JP | 5124853 | B2 * | 1/2013 | ....... B60R 25/02153 |

* cited by examiner

*Primary Examiner* — Emma K Frick
(74) *Attorney, Agent, or Firm* — Slater Matsil, LLP

(57) ABSTRACT

An embodiment personal mobility includes a steering bar, a steering rod provided on the steering bar and configured to rotate according to a rotation of the steering bar, a stopper provided on the steering bar and configured to change a rotation radius of the steering rod, a stopper driving device configured to control a rotation of the stopper, and a controller configured to control the stopper driving device such that the steering rod is rotatable in a state in which the personal mobility is rented and to control the stopper driving device such that the steering rod is not rotatable in a state in which the personal mobility is returned.

17 Claims, 8 Drawing Sheets

PERSONAL MOBILITY AND CONTROL METHOD THEREOF

CROSS-REFERENCE TO RELATED APPLICATIONS

This application claims the benefit of Korean Patent Application No. 10-2021-0044468, filed on Apr. 6, 2021, which application is hereby incorporated herein by reference.

TECHNICAL FIELD

The disclosure relates to a personal mobility and a control method thereof.

BACKGROUND

Recently, as the market for a personal mobility, which is a means of transportation for one person driven by electricity, has expanded, the number of users using the personal mobility is increasing.

A personal mobility business operator provides a service for renting and returning the personal mobility within a certain service area and sets the service area in consideration of demand for the personal mobility, redistribution of the personal mobility, and the like.

In the case of a free-floating method, the personal mobility may be rented and returned anywhere other than a designated parking area, but due to a small structure of wheels of the personal mobility, it is difficult to install a locking device on the personal mobility, so simply cutting off a motor power may be applied, and when the movement of a waiting personal mobility is detected, a method of sounding an alarm is used.

However, this method has a problem in that it is only an additional method to awaken the surroundings to prevent theft and loss, and is not a fundamental solution to prevent theft and loss of the personal mobility.

In addition, an algorithm for restraining a motor of the personal mobility may be applied, but this method has the inconvenience of continuously identifying a driving situation of the motor, and may consume unnecessary power even while not using the personal mobility.

SUMMARY

An embodiment of the disclosure provides a personal mobility in which a stopper for controlling rotation of a steering rod is provided on a steering bar so that when the personal mobility is returned, the movement of the personal mobility may be directly prevented.

Additional embodiments of the disclosure will be set forth in part in the description which follows and, in part, will be obvious from the description, or may be learned by practice of the disclosure.

In accordance with an embodiment of the disclosure, a personal mobility includes a steering bar, a steering rod provided on the steering bar to rotate according to the rotation of the steering bar, a stopper provided on the steering bar to change a rotation radius of the steering rod, a stopper driving device provided to control the rotation of the stopper, and a controller provided to control the stopper driving device so that the steering rod is rotatable when the personal mobility is rented and to control the stopper driving device so that the steering rod is not rotatable when the personal mobility is returned.

The controller may be provided to determine open and closed states of a kickstand.

The controller may control the stopper driving device so that the steering rod is rotatable by increasing a rotation radius of the steering rod when the kickstand is in the closed state.

The controller may control the stopper driving device so that the steering rod is not rotatable by decreasing a rotation radius of the steering rod when the kickstand is in the open state.

The stopper may have a cylindrical shape and include a locking part provided on one surface facing the steering rod.

The controller may control the stopper driving device so that the locking part of the stopper directs to a center of a rotation radius of the steering rod when the personal mobility is rented.

The controller may control the stopper driving device so that the locking part of the stopper directs to an end of a rotation radius of the steering rod when the personal mobility is returned.

The steering rod may include a protrusion part provided on an outer surface of the steering rod.

The controller may determine that the personal mobility is returned when it is detected that the protrusion part of the steering rod is caught on the locking part of the stopper.

The controller may control the stopper to rotate by an angle of 180 degrees.

In accordance with an embodiment of the disclosure, a control method of a personal mobility includes controlling a stopper driving device so that a steering rod is rotatable when the personal mobility is rented, and controlling the stopper driving device so that the steering rod is not rotatable when the personal mobility is returned, wherein the stopper driving device is provided to control rotation of a stopper, and the stopper is provided on a steering bar to change a rotation radius of the steering rod.

The control method may further include determining open and closed states of a kickstand.

The control method may further include controlling the stopper driving device so that the steering rod is rotatable by increasing a rotation radius of the steering rod when the kickstand is in the closed state.

The control method may further include controlling the stopper driving device so that the steering rod is not rotatable by decreasing a rotation radius of the steering rod when the kickstand is in the open state.

The stopper may have a cylindrical shape and include a locking part provided on one surface facing the steering rod.

The control method may further include controlling the stopper driving device so that the locking part of the stopper directs to a center of a rotation radius of the steering rod when the personal mobility is rented.

The control method may further include controlling the stopper driving device so that the locking part of the stopper directs to an end of a rotation radius of the steering rod when the personal mobility is returned.

The steering rod may include a protrusion part provided on an outer surface of the steering rod.

The control method may further include determining that the personal mobility is returned when it is detected that the protrusion part of the steering rod is caught on the locking part of the stopper.

The control method may further include controlling the stopper to rotate by an angle of 180 degrees.

BRIEF DESCRIPTION OF THE DRAWINGS

These and/or other embodiments of the disclosure will become apparent and more readily appreciated from the following description of exemplary embodiments, taken in conjunction with the accompanying drawings, in which.

DETAILED DESCRIPTION OF ILLUSTRATIVE EMBODIMENTS

Throughout the specification, like reference numerals refer to like elements. This specification does not describe all the elements of the embodiments, and duplicative contents between general contents or embodiments in the technical field of the disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

In the present specification, it will also be understood that when an element is referred to as being "on" or "over" another element, it may be directly on the other element or intervening elements may also be present.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, the disclosure will be described in detail with reference to the accompanying drawings.

Figure 1:
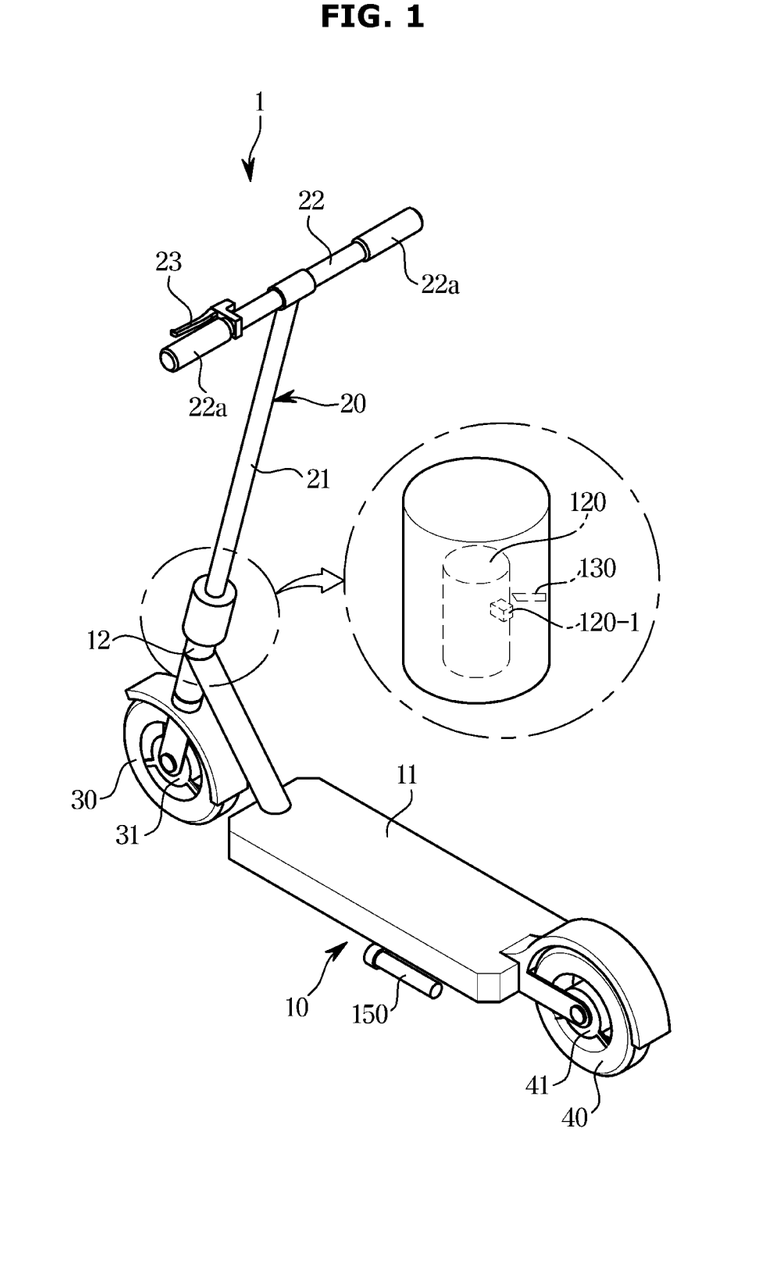
FIG. 1 illustrates a personal mobility according to an embodiment of the disclosure.
Figure 2:
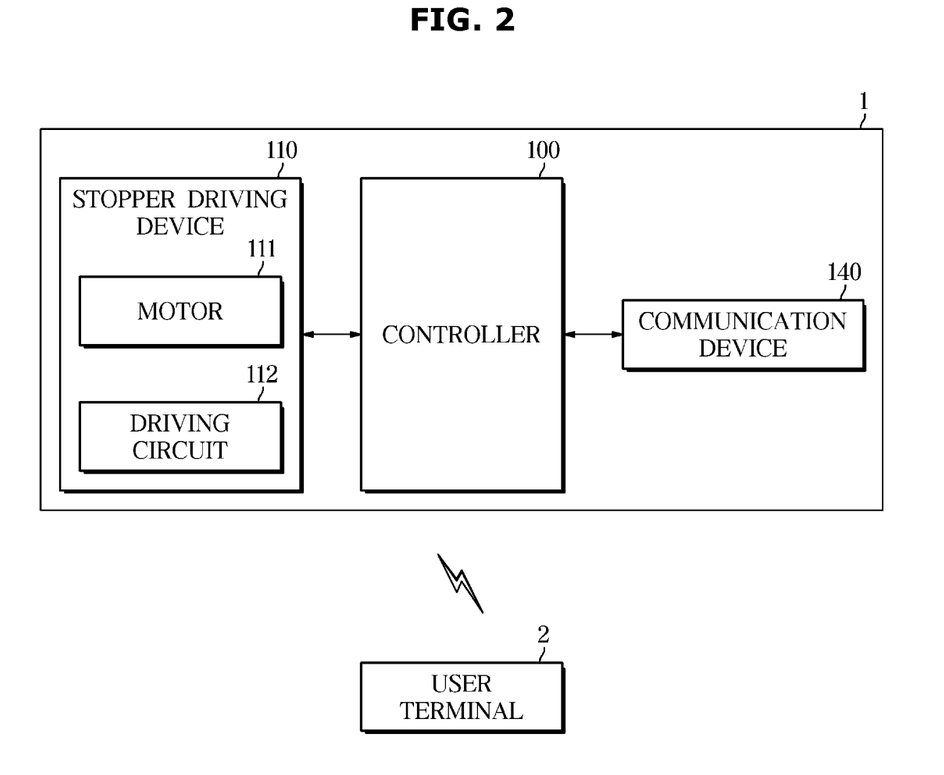
FIG. 2 illustrates a control block diagram of a personal mobility according to an embodiment of the disclosure.

FIG. 1 illustrates a personal mobility according to an embodiment of the disclosure, and FIG. 2 illustrates a control block diagram of a personal mobility according to an embodiment of the disclosure.

Referring to FIG. 1, a personal mobility 1 may include a main body 10 provided with a footrest 11 on an upper side, a steering bar 20 provided in front of the main body 10, a front wheel 30 installed at a lower end of the steering bar 20, and a rear wheel 40 and a kickstand 150 installed at a rear end of the main body 10.

The front wheel 30 and the rear wheel 40 may include driving motors 31 and 41 for driving and braking devices for braking, respectively. The main body 10 may include a battery for supplying power to the driving motors 31 and 41 of the front wheel 30 and the rear wheel 40.

The steering bar 20 includes a steering shaft 21 rotatably installed on a shaft support 12 of a front end of the main body 10, and a steering handle 22 connected to an upper end of the steering shaft 21 and provided with handle parts 22a on opposite sides, respectively. An operation member for controlling driving and a brake lever 23 for controlling braking may be installed on one of the handle parts 22a of the steering handle 22.

The steering bar 20 may be provided at a portion to which the steering shaft 21 is connected so that rotation of the steering shaft 21, that is, rotation of a steering rod 120 may be limited.

The personal mobility 1 may include a stopper 130 to control the rotation of the steering rod 120, and the stopper 130 may be provided in a cylindrical shape to move forward and backward on a rotation path of the steering rod 120. Although an embodiment of the disclosure illustrates that the stopper 130 is provided in a cylindrical shape, as long as the stopper 130 may move forward and backward to enter the rotation path of the steering rod 120, the stopper 130 may have various shapes.

The stopper 130 may be provided at a portion where the steering shaft 21 of the front end of the main body 10 and the shaft support 12 are connected to limit the rotation of the steering rod 120 of the steering shaft 21 in a rental state or a waiting state of the personal mobility 1.

The steering rod 120 may include a protrusion pall 120-1 provided to protrude from an outer surface of the steering rod 120.

When a user rotates the steering bar 20, the protrusion part 120-1 may rotate together with the steering rod 120 according to the rotation of the steering shaft 21, that is, the rotation of the steering rod 120. The protrusion part 120-1 may come into contact with the stopper 130 to face the stopper 130 by protruding from the outer surface of the steering rod 120.

Referring to FIGS. 1 and 2, the personal mobility 1 includes the steering bar 20, the steering rod 120 provided on the steering bar 20 to rotate together with rotation of the steering bar 20, the stopper 130 provided to change a rotation radius of the steering rod 120, and a stopper driving device no provided to control rotation of the stopper 130, and may include a controller 100 provided to control the stopper driving device no so that the steering rod 120 is rotatable when the personal mobility 1 is rented and to control the stopper driving device no so that the steering rod 120 is not rotatable when the personal mobility 1 is returned.

Also, the personal mobility 1 may include a communication device 140 provided to communicate with a user terminal 2.

The communication device 140 may support communication between a cloud control server managing the personal mobility 1 and the personal mobility 1, and may be a telecommunication network, for example, at least one of a computer network (e.g., LAN or WAN), an Internet, and a telephone network. However, the type of communication is not limited to the above example, and may be included without limitation as long as it is a network for supporting communication.

The controller wo may determine open and closed states of the kickstand 150 of the personal mobility 1 when there is a request for rental of the personal mobility 1 from the user and the personal mobility 1 is rented. In this case, the open state of the kickstand 150 may refer to a state in which a portion of the kickstand 150 is in contact with the ground so that the personal mobility 1 is supported so as not to fall over. On the other hand, the closed state of the kickstand 150 may refer to a state in which the kickstand 150 is not in contact with the ground so that the personal mobility 1 is not fixed to be movable.

Specifically, the controller 100 may determine that the personal mobility 1 is in a non-moving state, that is, in a waiting state when the kickstand 150 of the personal mobility 1 is in the open state.

The controller 100 may determine that the personal mobility 1 is in a moving state, that is, in a rental state when the kickstand 150 of the personal mobility 1 is in the closed state.

When an input for the user to rent the personal mobility 1 is received through the user terminal 2, the controller 100 may control the stopper driving device no so that the steering rod 120 of the personal mobility 1 which is waiting is rotatable.

When the rental time of the personal mobility 1 is over and the personal mobility 1 is requested to be returned, the controller 100 may control the stopper driving device no so that the steering rod 120 of the personal mobility 1 is non-rotatable.

In a case in which the protrusion part 120-1 of the steering rod 120 is caught on the stopper 130 and the rotation of the steering rod 120 is impossible, when the front wheel 30 of the personal mobility 1 is in contact with the ground, a linear movement of the personal mobility 1 is impossible, thereby preventing theft and loss.

The controller 100 may control the stopper driving device no so that the stopper 130 rotates by an angle of 180 degrees. An embodiment of the disclosure illustrates that the rotatable range of the stopper 130 is set to 180 degrees, but as long as the stopper 130 may be in contact with the protrusion part 120-1 of the steering rod 120, the rotation range of the stopper 130 may be set variously.

The controller 100 may transmit a control signal for controlling the rotation of the stopper 130 to a driving circuit 112.

In this case, a motor 111 may be driven based on the control signal received by the driving circuit 112, and as a rotational force by the driving of the motor 111 is transmitted to the stopper 130, the stopper 130 may rotate.

The motor 111 may be provided in the steering bar 20.

The stopper driving device no may include various driving devices such as a solenoid in addition to a driving device such as the motor 111 described above to transmit the rotational force to the stopper 130.

The controller 100 may determine that the personal mobility 1 has been returned when it is detected that the protrusion part 120-1 of the steering rod 120 pushes the stopper 130 outward and passes over the stopper 130, and then is caught on the locking pall 130-1 of the stopper 130.

The controller 100 may transmit to the user terminal 2 a pop-up message informing that the personal mobility 1 is in a return completion state when the personal mobility 1 is in a normal return state.

The controller 100 may transmit to the cloud control server a return completion processing signal indicating that the personal mobility 1 is normally returned when the personal mobility 1 is in the normal return state.

Accordingly, because the return process is automatically completed in the cloud control server, the user does not need to complete the return of the personal mobility 1 directly through the application, so that the user may rent the personal mobility 1 more conveniently.

When it is not detected that the protrusion part 120-1 of the steering rod 120 is caught on the stopper 130 even though the return of the personal mobility 1 is completed, it may be determined that the return of the personal mobility 1 is not normally performed.

When the normal return of the personal mobility 1 is not performed, the controller 100 may transmit a pop-up message to the user terminal 2 informing the user to steer the steering wheel of the personal mobility 1 again. In this case, the user may again steer the steering bar 20 toward an end of the steering wheel to apply a force so that the protrusion part 120-1 of the steering rod 120 is caught on the stopper 130.

The controller 100 may not transmit the return completion processing signal of the personal mobility 1 to the cloud control server when the personal mobility 1 is not in the normal return state.

Figure 3A:
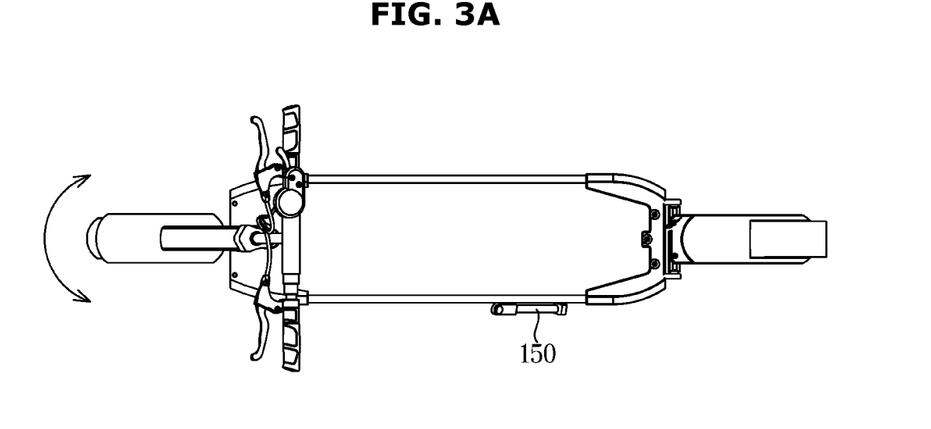
FIGS. 3A and 3B are views illustrating states of a kickstand of a personal mobility according to an embodiment of the disclosure.
Figure 3B:
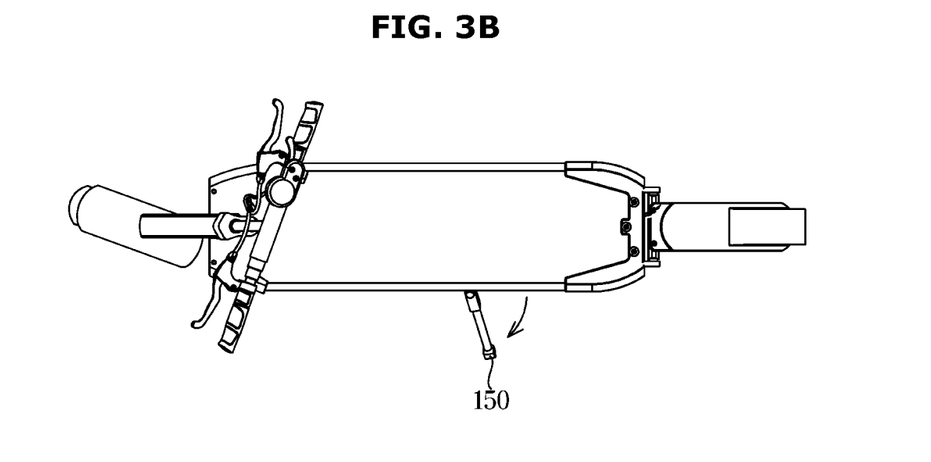

FIGS. 3A and 3B are views illustrating states of the kickstand 150 of the personal mobility 1 according to an embodiment of the disclosure.

Referring to FIG. 3A, when the kickstand 150 is in the closed state, the personal mobility 1 may determine that the personal mobility 1 is moving, that is, being rented. In this case, the steering bar 20 may be moved freely so that the movement of the personal mobility 1 may be possible.

Referring to FIG. 3B, when the kickstand 150 is in the open state, the personal mobility 1 may determine that the personal mobility 1 is not moving, that is, waiting.

In this case, the rotation of the steering bar 20 may be limited so that the movement of the personal mobility 1 is impossible.

FIGS. 4A to 4D are cross-sectional views of the steering bar 20 of the personal mobility 1 according to an embodiment of the disclosure.

Figure 4A:
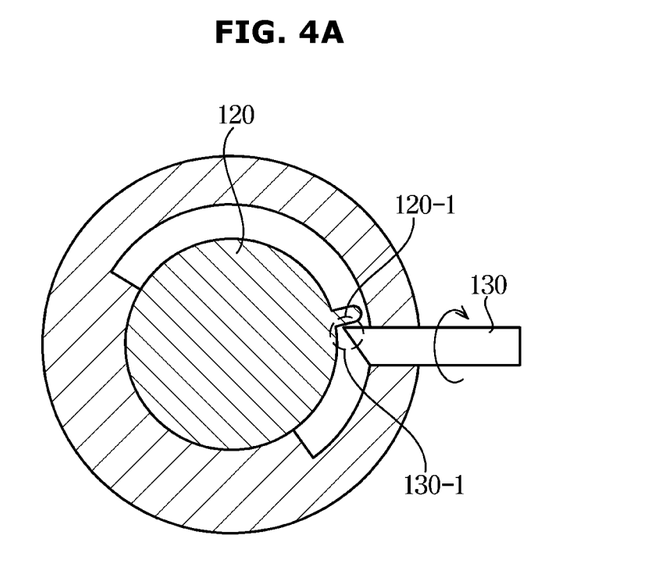
FIGS. 4A to 4D are cross-sectional views of a steering bar of a personal mobility according to an embodiment of the disclosure.

Referring to FIG. 4A, when the personal mobility 1 is rented, the personal mobility 1 may control the stopper 130 so that the rotation of the steering rod 120 provided on the steering bar 20 is possible.

More specifically, the personal mobility 1 may control the locking part 130-1 of the stopper 130 to direct to a center of the rotation radius of the steering rod 120.

In this case, the personal mobility 1 may rotate the stopper 130 by driving the motor in connected to the stopper 130 so that the locking part 130-1 of the stopper 130 directs to the center of the rotation radius of the steering rod 120.

Figure 4B:
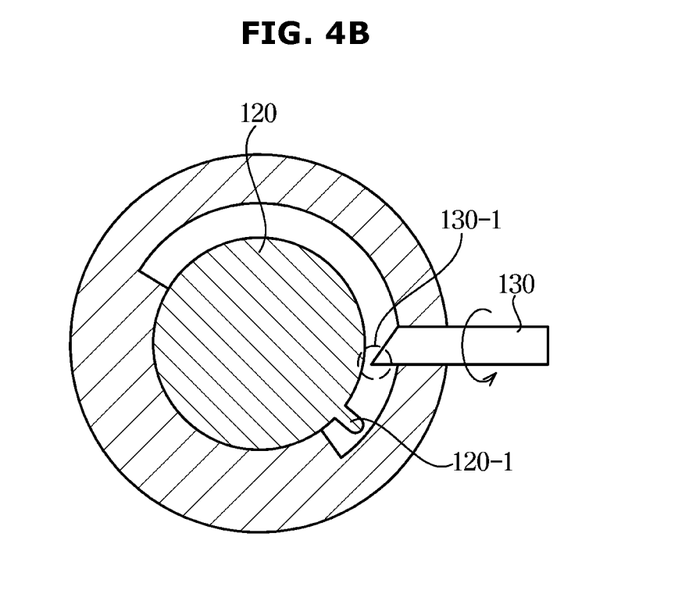

Referring to FIG. 4B, when the personal mobility 1 is rented, the personal mobility 1 may control the stopper 130 so that the rotation of the steering rod 120 provided on the steering bar 20 is impossible.

More specifically, the personal mobility 1 may control the locking pall 130-1 of the stopper 130 to direct to an end of the rotation radius of the steering rod 120.

In this case, the personal mobility 1 may rotate the stopper 130 by the angle of 180 degrees by driving the motor 111 connected to the stopper 130 so that the locking part 130-1 of the stopper 130 directs to the end of the rotation radius of the steering rod 120.

Accordingly, because even when the user tries to rotate the steering bar 20, the protrusion part 120-1 of the steering rod 120 is caught on the locking pall 130-1 of the stopper 130, the rotation of the steering rod 120, that is, the rotation of the steering bar 20 may be impossible.

When the user requests rental through the user terminal 2 to rent the personal mobility 1 in a state in which the steering rod 120 is non-rotatable (FIG. 4B), the personal mobility 1 may control such that the rotation of the steering rod 120 is possible.

Figure 4C:
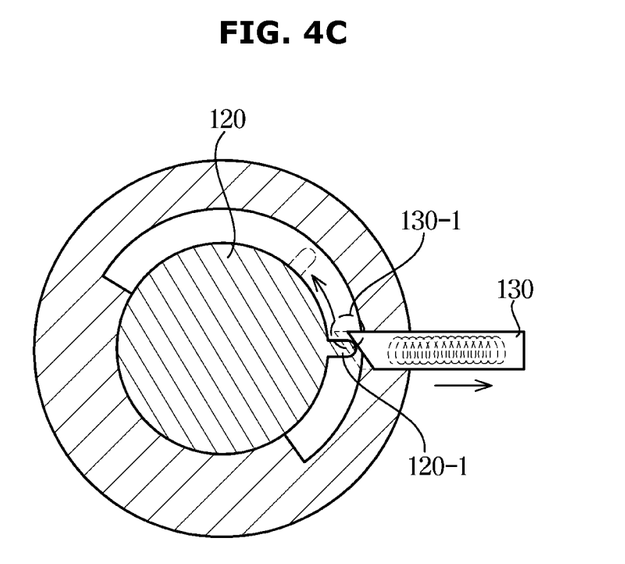

Referring to FIG. 4C, the personal mobility 1 may rotate the stopper 130 so that the locking part 130-1 of the stopper 130 directs to the center of the rotation radius of the steering rod 120.

For example, when the personal mobility 1 is rented, as illustrated in FIG. 4C, when the user applies a force to adjust the steering bar 20 in a state in which the stopper 130 is rotated so that the locking part 130-1 of the stopper 130 directs to the center of the rotation radius of the steering rod 120, the protrusion part 120-1 of the steering rod 120 may come into contact with one surface of the stopper 130 to push the stopper 130 outward from the steering bar 20.

Also, the protrusion part 120-1 may pass over the locking part 130-1 of the stopper 130 along the one surface of the stopper 130. Accordingly, as illustrated in FIG. 4A, a large rotatable radius of the steering rod 120 is secured so that the user may freely adjust the steering bar 20.

The one surface of the stopper 130 in contact with the protrusion part 120-1 may have a cross section inclined at a predetermined angle compared to the other surface. In other words, a diameter of the one surface of the stopper 130 in contact with the protrusion part 120-1 may be larger than a diameter of the other surface.

Figure 4D:
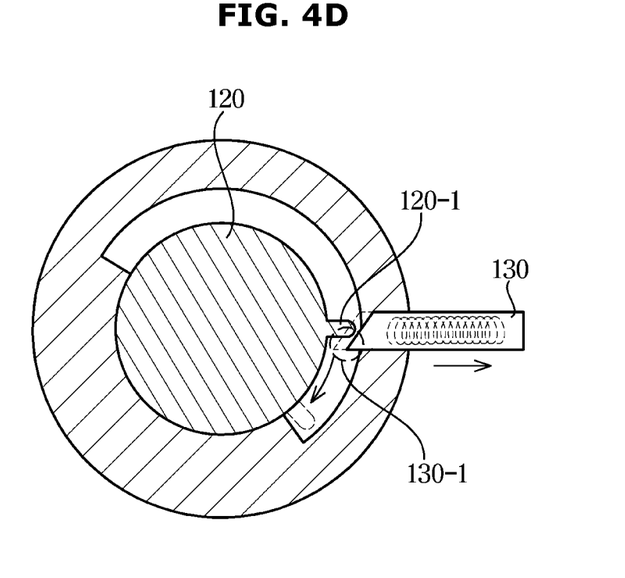

Similarly, when the user returns the personal mobility 1 by controlling the kickstand 150 to the open state in order for the user to return the personal mobility 1, the personal mobility 1 may control the steering rod 120 so that rotation of the steering rod 120 is impossible.

Referring to FIG. 4D, the personal mobility 1 may rotate the stopper 130 so that the locking part 130-1 of the stopper 130 directs to the end of the rotation radius of the steering rod 120.

For example, when the personal mobility 1 is rented, as illustrated in FIG. 4D, when the user applies a force to the steering bar 20 to rotate the steering wheel to the end in a state in which the stopper 130 is rotated so that the locking part 130-1 of the stopper 130 directs to the end of the rotation radius of the steering rod 120, the protrusion part 120-1 of the steering rod 120 may come into contact with one surface of the stopper 130 to push the stopper 130 outward from the steering bar 20.

Also, the protrusion part 120-1 may pass over the locking part 130-1 of the stopper 130 along the one surface of the stopper 130

Accordingly, as illustrated in FIG. 4B, even when the user tries to rotate the steering bar 20, the protrusion part 120-1 of the steering rod 120 is caught on the locking part 130-1 of the stopper 130, so that the rotation of the steering rod 120 may be impossible.

The stopper 130 may include a pressing spring, so that the stopper 130 may operate to move forward and backward using the pressing spring.

Figure 5A:
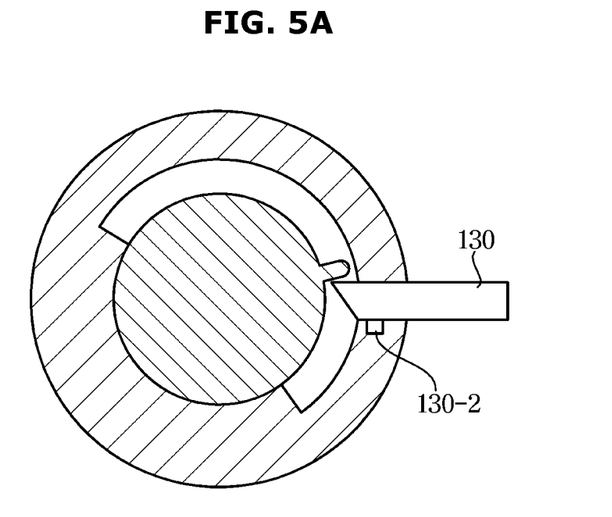
FIG. 5A is a cross-sectional view of a steering bar of a personal mobility according to an embodiment of the disclosure.

FIG. 5A is a cross-sectional view of the steering bar of the personal mobility according to an embodiment of the disclosure.

Figure 5B:
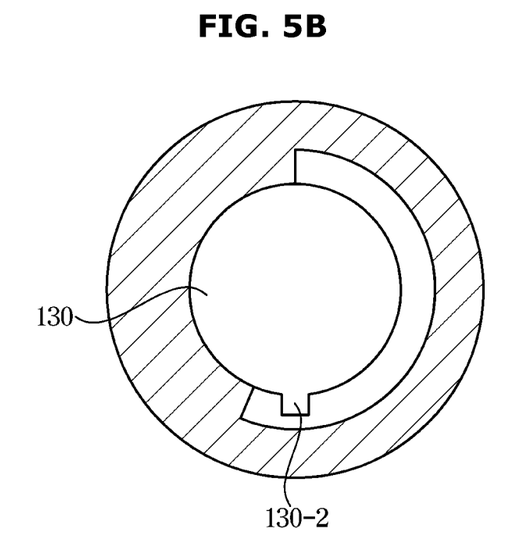
FIG. 5B is a cross-sectional view of a steering bar having a stopper of a personal mobility according to an embodiment of the disclosure.

FIG. 5B is a cross-sectional view of the stopper of the personal mobility according to an embodiment of the disclosure.

Referring to FIGS. 5A and 5B, the stopper 130 may include a fixing member 130-2.

The fixing member 130-2 may be provided to protrude by a predetermined length from an outer surface of the stopper 130 and may be provided in various shapes.

The fixing member 130-2 may protrude from the outer surface of the stopper 130 to prevent the stopper 130 from rotating beyond a predetermined range, that is, a predetermined angle.

For example, a groove may be provided in a gooseneck so that the fixing member 130-2 may rotate at the angle of 180 degrees. More specifically, a size of the groove may correspond to a size of the fixing member 130-2.

Figure 6:
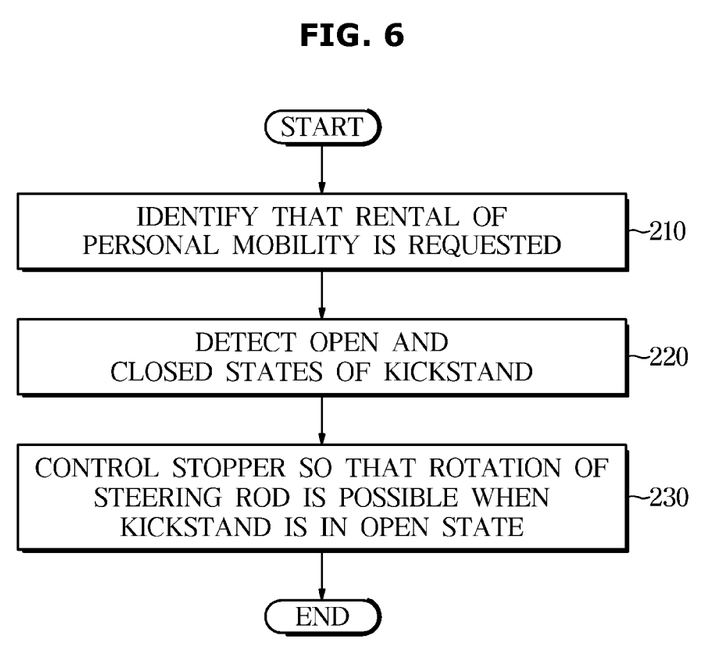
FIG. 6 is a flowchart of a method of controlling a personal mobility according to an embodiment of the disclosure.

FIG. 6 is a flowchart of a method of controlling a personal mobility according to an embodiment of the disclosure.

The personal mobility 1 may identify that the user has requested the rental of the personal mobility 1 through the user terminal 2 (210).

When the personal mobility 1 is rented, the personal mobility 1 may detect the open and closed states of the kickstand 150 (220).

When the kickstand 150 is in the closed state, the personal mobility 1 may determine that the personal mobility 1 is currently moving, that is, being rented.

When the kickstand 150 is in an open state, the personal mobility 1 may determine that the personal mobility 1 is currently waiting, and may control such that the user may use the currently waiting personal mobility 1 (230).

More specifically, the personal mobility 1 may control the stopper 130 so that the user may move the steering bar 20 of the personal mobility 1.

For example, the personal mobility 1 may control the stopper 130 so that the locking part 130-1 of the stopper 130 directs to the center of the rotation radius of the steering rod 120.

More specifically, the personal mobility 1 may transmit a control signal for controlling the rotation of the stopper 130 to the driving circuit 112. In this case, based on the control signal, the motor 111 may be driven, and according to the driving of the motor 111, a rotational force is transmitted to the stopper 130 so that the stopper 130 may rotate.

After the stopper 130 rotates, as the user applies a force to the steering bar 20 so that the protrusion part 120-1 of the steering rod 120 pushes the stopper 130 outward, the protrusion part 120-1 may pass over the locking part 130-1 along the one surface of the stopper 130.

Accordingly, the rotatable radius of the steering rod 120 increases so that the user may freely move the steering bar 20.

As described above, when the rotatable radius of the steering rod 120 increases so that the rotation of the steering bar 20 becomes free, the linear movement of the personal mobility 1 is impossible when the front wheel 30 is in contact with the ground, thereby preventing theft and loss.

Although an embodiment of the disclosure illustrates that the open and closed states of the kickstand 150 are determined and the stopper 130 is controlled based on this determination, when the personal mobility 1 is rented by a rental request of the personal mobility 1 through the user terminal 2, the stopper 130 may be directly controlled without determining whether the kickstand 150 is open or closed.

Figure 7:
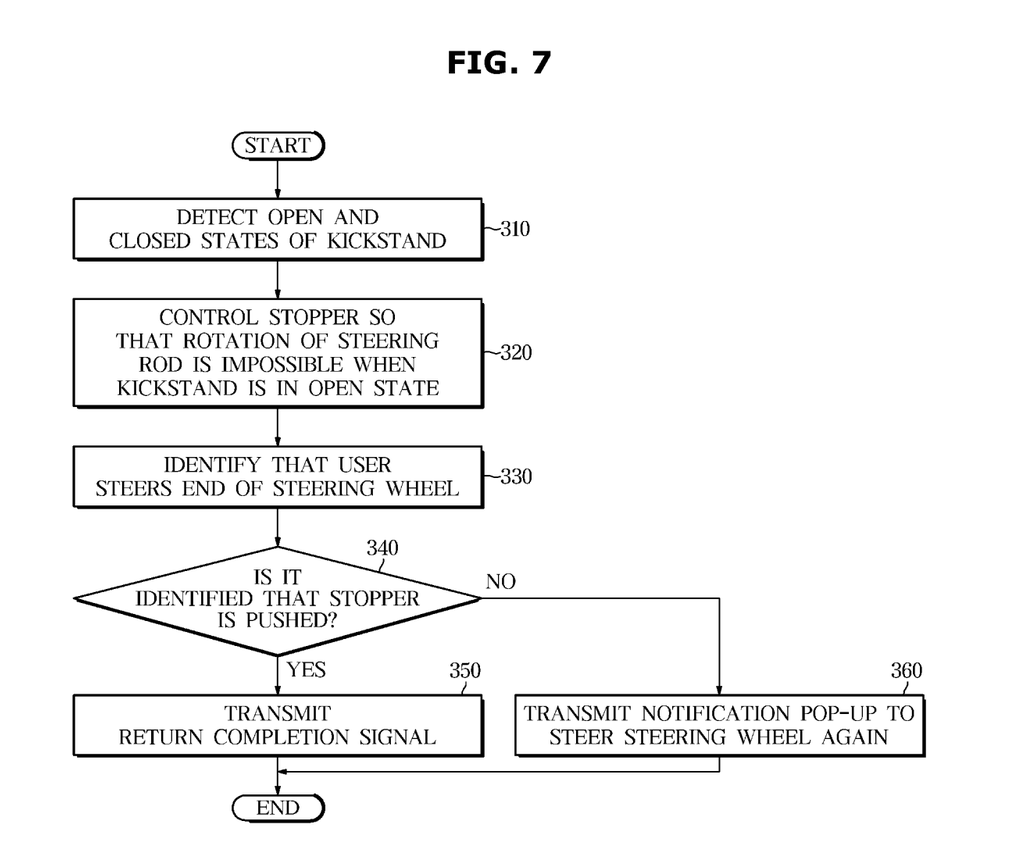
FIG. 7 is a flowchart of a method of controlling a personal mobility according to another embodiment of the disclosure.

FIG. 7 is a flowchart of a method of controlling the personal mobility 1 according to another embodiment of the disclosure.

When a return time of the personal mobility 1 approaches, the personal mobility 1 may detect the open and closed states of the kickstand 150 in order to determine whether the user has opened and parked the kickstand 150 (310).

When the kickstand 150 is in the open state, the personal mobility 1 may determine that the personal mobility 1 is stopped and in the returned state.

When the personal mobility 1 is stopped and in the returned state, the personal mobility 1 may control the rotation of the steering rod 120 to be impossible so that the steering bar 20 of the personal mobility 1 does not move any more (320).

More specifically, the personal mobility 1 may control the stopper 130 so that the user does not move the steering bar 20 of the personal mobility 1 any longer.

For example, the personal mobility 1 may control the stopper 130 so that the locking part 130-1 of the stopper 130 directs to the end of the rotation radius of the steering rod 120.

After the stopper 130 rotates, as the user applies a force to the steering bar 20 so that the protrusion part 120-1 of the steering rod 120 pushes the stopper 130 outward, the protrusion part 120-1 may pass over the locking part 130-1 along the one surface of the stopper 130.

In this case, the protrusion part 120-1 of the steering rod 120 may be caught on the locking part 130-1 of the stopper 130.

Accordingly, the rotatable radius of the steering rod 120 decreases so that the steering bar 20 does not move any more.

The personal mobility 1 may identify that the user steers the end of the steering wheel by adjusting the steering bar 20 (330). If the personal mobility 1 does not identify that the user steers the end of the steering wheel, the flow may end or return to the start.

The personal mobility 1 may identify whether the protrusion part 120-1 moves to the end of the rotation radius of the steering rod 120 so that the protrusion part 120-1 of the steering rod 120 passes over the stopper 130 and is caught on the stopper 130 (340).

As described above, when the protrusion part 120-1 of the steering rod 120 is caught on the stopper 130 so that the rotation of the steering bar 20 is impossible, the linear movement of the personal mobility 1 is impossible, thereby preventing theft and loss.

In addition, when it is identified that the protrusion part 120-1 is caught on the stopper 130 by the stopper 130 being pushed, the personal mobility 1 may determine that the return of the personal mobility 1 is complete and transmit a return completion processing signal to the cloud control server (350).

When the protrusion part 120-1 does not pass over the stopper 130 so that the protrusion part 120-1 is not caught on the stopper 130, the personal mobility 1 may transmit a notification pop-up to the user terminal 2 so that the user adjusts the steering bar 20 again to steer to the end of the steering wheel (360).

Herein, the disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes various kinds of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

As is apparent from the above, a personal mobility according to an embodiment of the disclosure can convert a steering wheel to a non-steerable state in a waiting state to restrict movement of the personal mobility, thereby preventing a direct theft.

Further, the return of the personal mobility according to an embodiment of the disclosure can be automatically completed by converting the steering wheel to the non-steerable state by a simple manipulation upon return, so that the inconvenience that a user has to return the personal mobility through an application can be resolved.

The embodiments disclosed with reference to the accompanying drawings have been described above. However, it will be understood by those skilled in the art that various changes in form and details may be made therein without departing from the spirit and scope of the disclosure as defined by the appended claims. The disclosed embodiments are illustrative and should not be construed as limiting.

What is claimed is:

1. A personal mobility comprising:
   a steering bar;
   a steering rod provided inside the steering bar and configured to rotate according to a rotation of the steering bar, the steering rod including a protrusion part provided on an outer surface of the steering rod;
   a stopper provided on the steering bar and configured to change a rotation radius of the steering rod;
   a stopper driving device configured to control a rotation of the stopper; and
   a controller configured to control the stopper driving device such that the steering rod is rotatable in a state in which the personal mobility is rented and to control the stopper driving device such that the steering rod is not rotatable in a state in which the personal mobility is returned;
   wherein the stopper includes a locking part provided on a surface facing the steering rod;
   wherein a first surface of the locking part has a cross section inclined at a predetermined angle compared to a second surface of the locking part;
   wherein the steering rod is not rotatable by the protrusion part caught on the second surface of the locking part;
   wherein the controller is configured to control the stopper driving device such that the second surface of the locking part of the stopper directs to a center of the rotation radius of the steering rod in the state in which the personal mobility is rented; and
   wherein the controller is configured to control the stopper driving device such that the second surface of the locking part of the stopper directs to an end of the rotation radius of the steering rod in the state in which the personal mobility is returned.

2. The personal mobility according to claim 1, wherein the controller is configured to determine open and closed states of a kickstand.

3. The personal mobility according to claim 2, wherein the controller is configured to control the stopper driving device such that the steering rod is rotatable by increasing the rotation radius of the steering rod upon a determination that the kickstand is in the closed state.

4. The personal mobility according to claim 2, wherein the controller is configured to control the stopper driving device such that the steering rod is not rotatable by decreasing the rotation radius of the steering rod upon a determination that the kickstand is in the open state.

5. The personal mobility according to claim 1, wherein the controller is configured to determine that the personal mobility is in the state in which the personal mobility is returned in response to detecting that the protrusion part of the steering rod is caught on the locking part of the stopper.

6. The personal mobility according to claim 1, wherein the controller is configured to control the stopper to rotate by an angle of 180 degrees.

7. A control method of a personal mobility, the control method comprising:
controlling a stopper driving device such that a steering rod of the personal mobility is rotatable when the personal mobility is in a rented state; and
controlling the stopper driving device such that the steering rod is not rotatable when the personal mobility is in a returned state;
wherein the stopper driving device controls rotation of a stopper;
wherein the stopper is provided on a steering bar and changes a rotation radius of the steering rod;
wherein a movement area is provided inside the steering bar and in which a protrusion part of the steering rod moves in response to a rotation of the steering rod;
wherein the stopper includes a locking part provided on a surface facing the steering rod;
wherein a first surface of the locking part has a cross section inclined at a predetermined angle compared to a second surface of the locking part;
wherein the steering rod is not rotatable by the protrusion part caught on the second surface of the locking part;
wherein, in the rented state, the stopper driving device is controlled such that the second surface of the locking part of the stopper directs to a center of the rotation radius of the steering rod; and
wherein, in the returned state, the stopper driving device is controlled such that the second surface of the locking part of the stopper directs to an end of the rotation radius of the steering rod.

8. The control method according to claim 7, further comprising determining open and closed states of a kickstand.

9. The control method according to claim 8, further comprising controlling the stopper driving device such that the steering rod is rotatable by increasing the rotation radius of the steering rod in response to determining the kickstand is in the closed state.

10. The control method according to claim 8, further comprising controlling the stopper driving device such that the steering rod is not rotatable by decreasing the rotation radius of the steering rod in response to determining the kickstand is in the open state.

11. The control method according to claim 7, further comprising determining that the personal mobility is in the returned state upon detecting that the protrusion part of the steering rod is caught on the locking part of the stopper.

12. The control method according to claim 7, further comprising controlling the stopper to rotate by an angle of 180 degrees.

13. A personal mobility comprising:
a steering bar;
a steering rod provided on the steering bar and configured to rotate according to a rotation of the steering bar, wherein the steering rod comprises a protrusion part provided on an outer surface of the steering rod;
a stopper provided on the steering bar and configured to change a rotation radius of the steering rod, wherein the stopper has a cylindrical shape and comprises a locking part provided on one surface facing the steering rod;
a stopper driving device configured to control a rotation of the stopper; and
a controller configured to control the stopper driving device such that the steering rod is rotatable in a state in which the personal mobility is rented and to control the stopper driving device such that the steering rod is not rotatable in a state in which the personal mobility is returned, wherein the controller is configured to determine that the personal mobility is in the state in which the personal mobility is returned in response to detecting that the protrusion part of the steering rod is caught on the locking part of the stopper.

14. The personal mobility according to claim 13, wherein the controller is configured to determine open and closed states of a kickstand.

15. The personal mobility according to claim 14, wherein the controller is configured to control the stopper driving device such that the steering rod is rotatable by increasing the rotation radius of the steering rod upon a determination that the kickstand is in the closed state.

16. The personal mobility according to claim 14, wherein the controller is configured to control the stopper driving device such that the steering rod is not rotatable by decreasing the rotation radius of the steering rod upon a determination that the kickstand is in the open state.

17. The personal mobility according to claim 13, wherein the controller is configured to control the stopper to rotate by an angle of 180 degrees.

* * * * *